(12) United States Patent
Elfimov

(10) Patent No.: US 11,566,384 B2
(45) Date of Patent: Jan. 31, 2023

(54) ASPHALT PAVING AND STRIPPING SYSTEM AND METHOD USING HYDROPHOBIC MICROWAVE ABSORBING MATERIAL

(71) Applicant: Ivan Elfimov, Brooklyn, NY (US)

(72) Inventor: Ivan Elfimov, Brooklyn, NY (US)

( * ) Notice: Subject to any disclaimer, the term of this patent is extended or adjusted under 35 U.S.C. 154(b) by 181 days.

(21) Appl. No.: 17/237,318

(22) Filed: Apr. 22, 2021

(65) Prior Publication Data

US 2022/0341101 A1    Oct. 27, 2022

(51) Int. Cl.
*E01C 7/32* (2006.01)
*C09D 5/00* (2006.01)
*E01C 7/18* (2006.01)
*E01C 19/12* (2006.01)

(52) U.S. Cl.
CPC ............. *E01C 7/325* (2013.01); *C09D 5/002* (2013.01); *E01C 7/187* (2013.01); *E01C 19/12* (2013.01)

(58) Field of Classification Search
CPC .......... E01C 7/187; E01C 7/325; E01C 19/12; C09D 5/002
USPC ................... 404/17, 31, 75, 77, 79
See application file for complete search history.

(56) References Cited

U.S. PATENT DOCUMENTS

| | | | |
|---|---|---|---|
| 4,175,885 A | 11/1979 | Jeppson | |
| 4,252,459 A | 2/1981 | Jeppson | |
| 4,252,487 A | 2/1981 | Jeppson | |
| 4,276,093 A | 6/1981 | Pickermann | |
| 4,319,856 A | 3/1982 | Jeppson | |
| 4,347,016 A | 8/1982 | Sindelar | |
| 4,453,856 A | 6/1984 | Chiostri | |
| 4,594,022 A | 6/1986 | Jeppson | |
| 4,849,020 A | 7/1989 | Osborne | |
| 5,092,706 A | 3/1992 | Bowen | |
| 5,441,360 A * | 8/1995 | Long | E01C 7/182 106/277 |
| 5,653,552 A | 8/1997 | Wiley | |
| 6,024,788 A | 2/2000 | Tomioka | |
| 6,193,793 B1 * | 2/2001 | Long | C08L 95/00 106/13 |
| 7,413,375 B2 | 8/2008 | Hall | |
| 8,062,413 B1 | 11/2011 | Al-Mehthel | |
| 8,394,189 B2 | 3/2013 | Fader | |
| 8,556,536 B2 | 10/2013 | Giles | |
| 8,834,063 B2 | 9/2014 | Harakawa | |
| 2019/0017233 A1 * | 1/2019 | Coe | C09D 195/005 |

OTHER PUBLICATIONS

Al-Ohaly et al., "Effect of Microwave Heating on Adhesion and Moisture Damage of Asphalt Mixtures", Transportation Research Record 1171, 1998, pp. 27-36.

(Continued)

*Primary Examiner* — Raymond W Addie
(74) *Attorney, Agent, or Firm* — Koffsky Schwalb LLC

(57) ABSTRACT

Asphalt paving and stripping system and method involves the use of a primer, comprising hydrophobic microwave absorbing material mixed in a hydrophobic liquid, between an asphalt layer and a base layer below. The primer is configured to be deposited on the base layer at room temperature without preheating. Heating the hydrophobic microwave absorbing material, sandwiched between the asphalt and base layers, by microwave energy, allows stripping of the asphalt layer from the base layer by a wheel loader.

20 Claims, 3 Drawing Sheets

OTHER PUBLICATIONS

Gulisano et al., "Microwave heating of asphalt paving materials: Principles, current status and next steps", Construction and Building Materials 278 (2021) 121993, 12 pages.

John Livingston, "Carbon Black Additive in Asphalt, Experimental Project No. 3, WA84-04", WA-RD 198.1, Oct. 1989, 25 pages.

Ramirez-Canon et al., "Decomposition of Used Tyre Rubber by Pyrolysis: Enhancement of the Physical Properties of the Liguid Fraction Using a Hydrogen Stream", Environments, 2018, 5, 72, doi: 10.3390/environments5060072, www.mdpi.com/journal/environments, 12 pages.

Terrel et al., "Microwave Heating of Asphalt Paving Materials", 1987, pp. 454-491.

Zeng et al., "Final Report: Using Pyrolyzed Carbon Black(PCB) from Waste Tires in Asphalt Pavements (Part II: Asphalt Binder, and Test Road)," Purdue University, Feb. 1996, 159 pages.

\* cited by examiner

ASPHALT PAVING AND STRIPPING SYSTEM AND METHOD USING HYDROPHOBIC MICROWAVE ABSORBING MATERIAL

FIELD OF THE INVENTION

This invention relates to a field of paving and repairing asphalt roadways.

BACKGROUND OF THE INVENTION

Asphalt is commonly used for paving roadways, parking lots, sidewalks, and various other surfaces. A typical pavement structure consists of a sub-base course at the bottom, a base layer above the sub-base layer, and an asphalt layer at the surface, above the base layer. The sub-base course is usually made of crushed stone aggregate, cement concrete, or other similar materials, while the base layer is commonly constructed out of cement concrete or asphalt. Composition and thickness of the asphalt layer depends on the load capacity of the road, climate, and environmental conditions. (As used herein, the term "layer" may include one or more layers). When building such asphalt surfaced roadways, it is preferable to have the asphalt layer adhesively joined with the base layer.

Usually, the surface asphalt layer wears out and breaks down sooner than other courses. In some cases, more than one layer of asphalt needs to be replaced. There are multiple ways of asphalt removal (stripping) and replacement known in the art. One of the ways is a mechanical stripping of damaged asphalt using a road milling machine or similar mechanism. Road milling machines are expensive, difficult to operate and transport, and require large supplies of water during operation. Asphalt that is removed using such machines can be recycled and mixed with newly produced asphalt for further reuse in paving asphalt roadways.

There exist several known methods of asphalt repair using microwave energy. In one such method, a microwave absorbing (lossy) material, such as a spinel ferrite, is dispersed within the asphalt layer upon application. To remove such an asphalt layer, the road is irradiated with microwave energy, which is absorbed by the spinel ferrite, thus heating it. There is a number of disadvantages associated with this method. First, microwaves applied from above to the asphalt layer are absorbed by the lossy material mainly in the thin upper portion of asphalt layer and do not penetrate to a sufficient depth of the asphalt layer. As a result, only the top portion of the asphalt layer gets heated, which complicates removal of the full asphalt layer. Second, because the microwave absorbing material is distributed throughout the entire volume of the asphalt material, the method requires high amounts of the lossy material to be used when forming the road initially. Third, to create a homogeneous "asphalt-lossy material" mixture for the entire volume, external heating is required during mixing of the absorbing material with the asphalt material. This results in high energy costs.

Another known method for heating of asphalt by microwaves involves using a sheet of microwave reflecting material, such as a metal foil, under the asphalt layer. The disadvantages of this known method are at least (a) poor adhesion of asphalt layer and the base layer, (b) stripping of the asphalt layer damages the metal foil, making the foil nonreusable, and (c) to make the stripped asphalt material reusable, metal-foil pieces must be removed from it first.

Another known method of repairing voids in an asphalt roadway uses a composite tack comprising a mixture of tack material and a lossy microwave material at a relatively even weight ratio, such as a 1:1 ratio. The composite tack is applied on the bottom of the void at significant thicknesses, from $\frac{1}{16}$ of an inch to 1 inch. Afterwards, the void is filled with an asphalt material and the installation is radiated using microwave energy. Because the asphalt material does not absorb a significant amount of microwave energy, the energy is substantially absorbed in the composite tack, heating it up and making it function as a hot melt glue for the asphalt. This prior art void-filling method, however, also has several disadvantages. For example, the composite tack needs to be heated twice: once during mixing of the tack material with the lossy material, and the second time during application of the composite tack into the void. In addition, because of the significant thickness of the applied composite tack, the method requires a large volume of the composite tack material. Moreover, because of the even weight ratio between the tack material and the lossy material in the mixture, a large amount of lossy material is needed. All of these limitations result in increased costs.

Therefore, what is needed is a low-cost method of road paving and stripping that avoids the above-described problems of the prior art.

SUMMARY OF THE INVENTION

Asphalt paving and stripping system of the present invention involves using a special mixture (primer) between an asphalt layer and a base layer below it. The primer comprises at least two hydrophobic components (substances that do not mix with water). In particular, the novel primer comprises a hydrophobic microwave lossy material mixed in a hydrophobic liquid. The ratio of the hydrophobic microwave lossy material to the hydrophobic liquid in the mixture by weight is small, such as from about 1:99 to about 1:3. Mixing of the components can be performed at room temperature, such as between about 60 and about 80 degrees Fahrenheit, i.e., without any heating of the individual components. Thereafter, the resulting primer can also be applied by spraying, via a roller, or other means, during paving without preheating.

The low proportion of the hydrophobic lossy microwave material required for creating the primer, coupled with the ability to mix hydrophobic components and to apply the resulting primer at room temperature, reduces the overall paving-project costs.

During paving, the primer is applied to a base layer (e.g., by spraying, via a roller, or other known means) at a thickness of less than about 0.02 inches and an asphalt layer is laid on top. The hydrophobic liquid of the primer facilitates joinder (promotes adhesion) between the base layer and the asphalt layer. An ability to deposit the primer at such a small thickness reduces the volume of primer needed, further reducing material costs.

During stripping of an asphalt layer from a roadway formed using the new primer, the hydrophobic material, interposed between the base layer and the asphalt layer, is heated via microwave radiation. This, in turn, weakens the adhesion between the base layer and the asphalt layer and allows inexpensive removal by stripping, as opposed to milling, of the asphalt layer from the base layer by a wheel loader or another similar mechanism. As a result, the invented method does not require use of milling machines, which are expensive and difficult to operate.

In one embodiment, the primer comprises a hydrophobic liquid and a first hydrophobic material dispersed within the hydrophobic liquid, the first hydrophobic material having a property of heating upon being exposed to microwave energy, wherein the weight ratio of the first hydrophobic material to the hydrophobic liquid is from about 1:99 to about 1:3, and wherein the first hydrophobic material is mixable with said hydrophobic liquid at about 75 degrees Fahrenheit ambient without heating.

In one embodiment, the novel paving method comprises the steps of: (a) laying a layer of base material; (b) spraying a primer onto said layer of base material at a thickness of less than about 0.02 inches, said primer comprising a first hydrophobic material dispersed withing a hydrophobic liquid, said first hydrophobic material having a property of heating upon being exposed to a microwave energy, wherein a weight ratio of said first hydrophobic material to said hydrophobic liquid is from about 1:99 to about 1:3, and wherein said first hydrophobic material is mixable with said hydrophobic liquid at about 75 degrees Fahrenheit ambient without heating; and (c) laying an asphalt layer on top of said primer.

In one embodiment of the invention, a pavement comprises: a base layer, an asphalt layer above said base layer and adhesively joined to said base layer; and a pyrolysis carbon black material of thickness less than about 0.02 inches interspersed between said asphalt layer and said base layer, wherein said pyrolysis carbon black material has a property of heating upon being exposed to a microwave energy; and wherein each of said asphalt layer and said base layer is substantially free of said pyrolysis carbon black material.

In one embodiment of the invention, a method of repairing the roadway having a base layer, an asphalt layer above said base layer, and a pyrolysis carbon black material having a thickness of less than about 0.02 inches interspersed between said asphalt layer and said base layer, wherein each of said asphalt layer and said base layer is substantially free of said pyrolysis carbon black material, said method comprising the steps of (a) radiating microwave energy from above said asphalt layer, wherein the radiated microwave energy penetrates through said asphalt layer and is substantially absorbed by said pyrolysis carbon black material, thereby heating said pyrolysis carbon black material and weakening adhesion between said base layer and said asphalt layer; and (b) stripping from said base layer at least a portion of said asphalt layer using a wheel loader. As a result, the invented system and method reduces the costs of labor and materials in asphalt paving and stripping projects.

BRIEF DESCRIPTION OF THE FIGURES

The accompanying figures, where like reference numerals refer to identical or functionally similar elements throughout the separate views, together with the detailed description below, are incorporated in, form part of the specification, and serve to further illustrate embodiments of concepts that include the claimed invention and explain various principles and advantages of those embodiments.

Figure 1A:
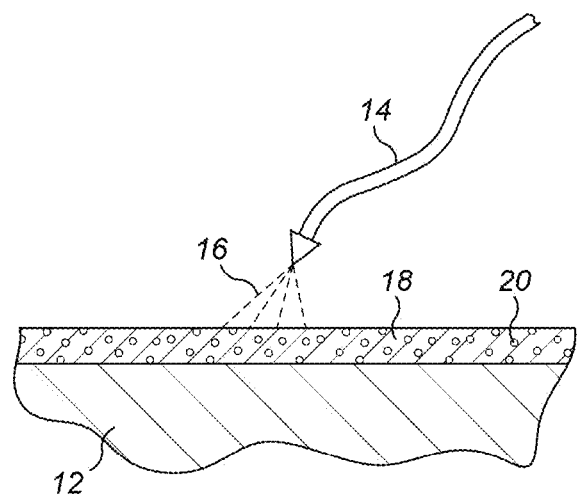
FIG. 1(a) shows an embodiment of the step of applying the primer during paving.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description discloses some embodiments of the invented system and method of the present invention.

Figure 1B:
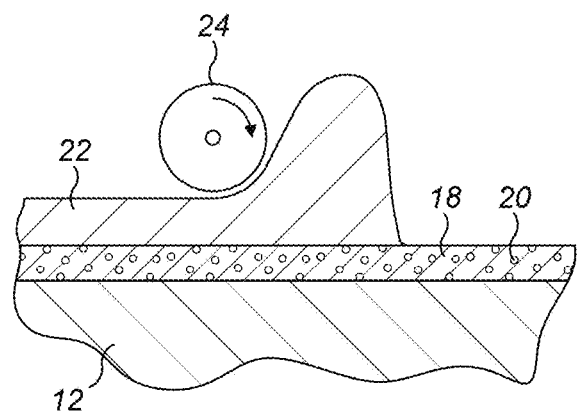
FIG. 1(b) shows an embodiment of the step of forming an asphalt layer during paving.
Figure 1C:
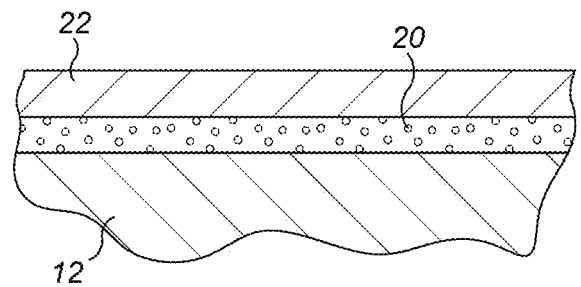
FIG. 1(c) shows a paved roadway according to an embodiment of the present invention.

FIGS. 1(a) through 1(c) illustrate various steps of the invented road paving method using the novel primer.

FIG. 1(a) shows a primer 16 being spayed by a sprayer 14 on a base layer 12, which could be concrete, Portland cement, or any other material known for use as a base layer. (A sub-base layer, not shown, may be supporting the base layer 12.) The depicted primer 16 includes a mixture comprising a hydrophobic material uniformly dispersed withing a hydrophobic liquid. In one embodiment, the hydrophobic liquid is a petrochemical substance, such as diesel fuel. The hydrophobic material of the present invention is a microwave energy absorbing (lossy) material, i.e., it has a property of heating when exposed to microwave energy.

In the primer of the present invention, weight ratio of the hydrophobic microwave absorbing material to the hydrophobic liquid is small, such as from about 1:99 to about 1:3, and preferably from about 1:19 to about 1:6, thus requiring relatively low amounts of the microwave absorbing material to create the required mixture. In addition, the use of hydrophobic substances in the above proportions allows their mixing at room temperature, such as between about 60 and about 80 degrees Fahrenheit, i.e., without any heating of the hydrophobic liquid or the hydrophobic microwave absorbing material. Thereafter, as shown in FIG. 1(a), the resulting primer can be applied to the roadway by spraying at a room temperature without preheating. In an alternative embodiment, the primer could also be applied via a roller, or other means, at a room temperature without preheating. (When preparing the primer in cold environments, i.e., cold ambient temperatures, heating of the components may be required to bring them to room temperature.) The hydrophobic microwave absorbing material is preferably chemically inert and heat resistant.

In one embodiment, the hydrophobic microwave absorbing material 12 is a product of a pyrolysis process or a depolymerization process, such as during recycling of carbon containing products, e.g., rubber products or tires. Although during mixing, the hydrophobic microwave absorbing material should be in a powder form, it could start in a granular form and then be converted into powder prior to mixing. For example, the hydrophobic microwave absorbing material might be transported to the mixing site as granules and then be converted into powder at the mixing site, which could also be the paving site itself.

In one embodiment, the hydrophobic microwave absorbing material is pyrolysis carbon black material. In another embodiment, the hydrophobic microwave absorbing material 12 is a heavy oil fly ash. In yet another embodiment, the hydrophobic microwave absorbing material 12 is soot.

In FIG. 1(*a*), the resulting thin layer of primer, comprising a hydrophobic microwave absorbing material 20 uniformly dispersed within a hydrophobic liquid 18, is shown applied on top of the base layer 12. In the preferred embodiment, the primer is laid on the base layer at a thickness of less than 0.02 inches, resulting in the overall primer consumption of about 2.88 in$^3$/ft$^2$.

FIG. 1(*b*) illustrates the step of forming an asphalt surface layer during paving. Particularly, FIG. 1(*b*) illustrates a hot asphalt material being applied on top of the base layer 12 and primer, forming an asphalt surface layer 22. Compacting of the asphalt material may be accomplished by a heavy roller/drum 24 or by any other technique known in the art. FIG. 1(*b*) shows the asphalt material being applied while the primer's hydrophobic liquid 18 is still present on the surface of the base layer 12 in liquid form. Although not shown in FIG. 1(*b*), compacting may force some of the primer to penetrate (spread) into a lower portion of the asphalt layer 22 and into a top portion of the base layer 12. The primer's hydrophobic liquid may constitute a solvent or thinner for substances included in the asphalt material, such that the hydrophobic liquid could enhance binding between the asphalt and base layers, and it may also improve thermal and mechanical properties of the asphalt layer at its lower portion. Although movement of the primer's hydrophobic liquid into the lower portion of the asphalt layer and the top portion of the base layer may carry with it small amounts of the hydrophobic microwave lossy material 20, most of the hydrophobic microwave lossy material 20 will remain dispersed at the interface between the base layer and the asphalt layer. As a result, the asphalt layer of the present invention will be substantially free of the hydrophobic microwave lossy material 20.

In an alternative embodiment, the asphalt material is applied after the primer's hydrophobic liquid 18 either has hardened, evaporated, or a combination of both. But even in this scenario, however, because most of the primer's hydrophobic microwave lossy material 20 will remain distributed on the surface of the base layer 12, the microwave lossy material will be sandwiched at the interface between the applied asphalt layer 22 and the base layer 12.

FIG. 1(*c*) shows a completed paved roadway according to an embodiment of the present invention. Specifically, it illustrates the hydrophobic microwave lossy material 20 disposed at an interface between the asphalt layer 22 and the base layer 12. The hydrophobic liquid does not appear in FIG. 1(*c*) because by this stage it either hardened, evaporated, or both.

Figure 2:
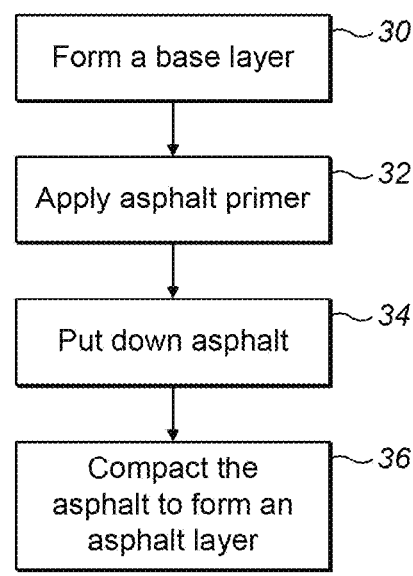
FIG. 2 is a flow chart illustrating an embodiment of road paving method of the present invention.

FIG. 2 is a flow chart illustrating an embodiment of road paving method of the present invention. The method starts with forming a base layer at Step 30. Note, where the base layer is supported by a sub-base layer, the sub-base layer may be formed first. Next, in Step 32, the primer is applied on top of the base layer. This is followed by Step 34, in which a hot asphalt material is put down on top of the base layer and the primer. Finally, in Step 36, the asphalt material is compacted to form an asphalt layer, resulting in the primer's hydrophobic microwave lossy material being sandwiched at the interface between the asphalt layer and the base layer.

Figure 3:
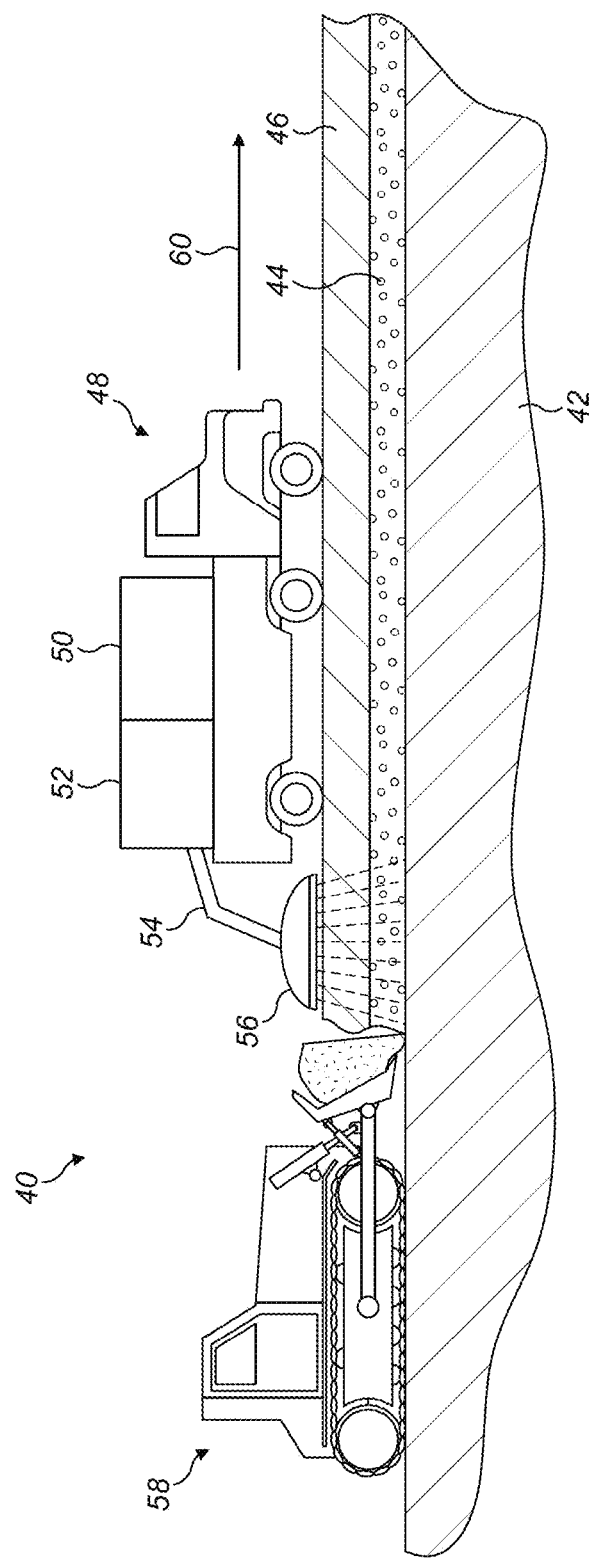
FIG. 3 illustrates an embodiment of the system for stripping an asphalt layer according to the present invention.

FIG. 3 illustrates an embodiment of the system for stripping an asphalt layer according to the present invention. Specifically, FIG. 3 illustrates an embodiment of the system 40 for stripping an asphalt layer from a roadway formed by using the novel primer. More particularly, FIG. 3 shows a roadway comprising a base layer 42, an asphalt surface layer 46, and a hydrophobic microwave absorbing material 44 disposed at the interface between the two layers. FIG. 3 also shows a wheel loader 58 and a vehicle 48 moving in a forward direction, as indicated by an arrow 60. The vehicle 48 carries a microwave generator 52 and a power source 50, for powering up the microwave generator. The power source could be any known source of electrical power, such as a generator or a battery. The microwave generator 52 is coupled, via a waveguide 54 to a microwave applicator 56. The microwave applicator 56 is preferably attached to the truck 48, so that movement of the truck also propels the applicator along and above the asphalt roadway. Although the FIG. 3 embodiment shows the power source 50, microwave generator 52, and applicator 56 as three separate elements, the invention also contemplates integrating one or more of these elements into a combined structure.

The microwave applicator 56 is shown as being located above the asphalt layer and radiates microwave energy down into the roadway. Although microwave frequencies can range between 300 MHz and 300 GHz, in the preferred embodiment, the microwaves are radiated at about 2.45 GHz. Because asphalt has low microwave energy absorption characteristic, and because the asphalt layer 46 is substantially free of the hydrophobic microwave absorbing material 44, most of the radiated microwave energy penetrates through the asphalt layer 46 and is absorbed by the hydrophobic microwave absorbing material 44 below. The absorbed microwave energy is then irreversibly converted into thermal energy, causing the temperature of the hydrophobic microwave absorbing material 44 to rise. This in turn weakens adhesion between the base layer 42 and the asphalt layer 46, increasing movability of the asphalt and making it easier to strip off the asphalt layer from the base layer. In a preferred embodiment, the hydrophobic microwave absorbing material 44 should be heated up to temperatures between around 150 and around 300 degrees Fahrenheit. In one embodiment, radiated power should be greater than about 1 kilowatt per square foot.

Because temperature increase in the hydrophobic microwave absorbing material 44 is a function of both the generated microwave power level and radiation duration, the present invention contemplates controlling one or both of these parameters to achieve a desired temperature of the hydrophobic microwave absorbing material 44. For example, the emitted energy and/or duration could depend on the power source, microwave generator capacity, microwave applicator efficiency, environmental conditions (ambient temperature, humidity, etc.), distance from the microwave applicator to the hydrophobic microwave absorbing material, and/or thickness of the asphalt later that the microwaves have to penetrate.

In addition, although it is preferable to have the microwave applicator 56 as close to the asphalt layer 46 as possible, the present invention contemplates controlling the height of the microwave applicator 56 above the asphalt layer 46.

As disclosed above, heating of the interface between the asphalt layer and the base layer weakens the adhesion between the two layers, making it easier to strip off (remove) the asphalt layer 46 from the base layer 42. In addition, gases may be released during the heating process, further contributing to the separation between the asphalt and base layers. Once a given duration has elapsed and the required temperature of the hydrophobic microwave absorbing material has been reached, the asphalt layer 46 can be easily stripped off the base layer 42 mechanically without the use of a milling machine. Because the stripped asphalt is substantially free of the hydrophobic microwave absorbing material, it can be reused to resurface the roadway or for other purposes. In FIG. 3, this is illustrated by a wheel loader 58 (or similar machine) following behind the vehicle 48 and striping off the asphalt layer 46 from the base layer 42.

In one alternative embodiment of the invented system, the vehicle 48 and the wheel loader 58 may be combined into a single vehicle performing both functions, microwave radiation of the roadway and asphalt layer stripping.

In contrast to prior art systems and methods, the invented method does not require heating of the entire asphalt layer, from the bottom up, to remove it. Instead, heating of the asphalt layer being removed occurs only at the bottom portion of the asphalt layer, due to the hydrophobic microwave absorbing material by the interface with the base layer. Heating only the interface part of the roadway, saves project time and energy costs. For example, considering a roadway having an asphalt layer of 1.5 to 2 inches thick, heating the hydrophobic microwave absorbing material as disclosed above for about 2-3 minutes would result in temperature difference between the top and bottom of the asphalt layer of about 60 to 100 degrees Fahrenheit.

The asphalt stripping method of the present invention provides low-cost alternative to the expensive prior art asphalt removal methods that required complicated mechanisms, such as road milling machines. The asphalt stripping method of the present invention replaces expensive road milling machines with inexpensive wheel loaders or similar mechanisms.

While the foregoing descriptions disclose specific values, unless expressly stated otherwise, other specific values may be used to achieve similar results. Further, the various features of the foregoing embodiments may be selected and combined to produce numerous variations of improved systems.

In the foregoing specification, exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings, and therefore the scope of the invention is to be limited only by the claims.

Moreover, in this document, relational terms such as first and second, and the like may be used solely to distinguish one entity or action from another entity or action without necessarily requiring or implying any actual relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes or contains a list of elements does not include only those elements but may include other elements not expressly listed or inherent to such process, method, article, or apparatus. An element preceded by "comprises . . . a,", "has . . . a," "includes . . . a," or "contains . . . a" does not, without more constraints, preclude the existence of additional identical elements in the process, method, article, or apparatus that comprises, has, includes or contains the element. The terms "a" and "an" are defined as one or more unless explicitly stated otherwise herein. The terms "substantially," "essentially," "approximately," "about" or any other version thereof, are defined as being close to as understood by one of ordinary skill in the art. The term "coupled" as used herein is defined as connected, although not necessarily directly. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A primer for asphalt pavements, the primer comprising:
a hydrophobic liquid; and
a first hydrophobic material dispersed withing said hydrophobic liquid, said first hydrophobic material having a property of enhanced heating upon being exposed to a microwave energy,
wherein a weight ratio of said first hydrophobic material to said hydrophobic liquid is from about 1:99 to about 1:3; and
wherein said first hydrophobic material is mixable with said hydrophobic liquid at about 75 degrees Fahrenheit ambient without heating.

2. The primer for asphalt pavements of claim 1, wherein the weight ratio of said first hydrophobic material to said hydrophobic liquid is from about 1:19 to about 1:6.

3. The primer for asphalt pavements of claim 1, wherein said hydrophobic liquid is obtained by depolymerization.

4. The primer for asphalt pavements of claim 1, wherein said first hydrophobic material is pyrolysis carbon black material.

5. The primer for asphalt pavements of claim 1, wherein said hydrophobic liquid is a pyrolysis oil.

6. The primer for asphalt pavements of claim 5, wherein said pyrolysis oil is obtained from pyrolysis of a carbon-comprising product.

7. The primer for asphalt pavements of claim 5, wherein said pyrolysis oil is obtained during a product-recycling process.

8. A paving method comprising the steps of:
a) laying a layer of base material,
b) spraying a primer onto said layer of base material at a thickness of less than about 0.02 inches, said primer comprising a first hydrophobic material dispersed withing a hydrophobic liquid, said first hydrophobic material having a property of heating upon being exposed to a microwave energy,
wherein a weight ratio of said first hydrophobic material to said hydrophobic liquid is from about 1:99 to about 1:3, and
wherein said first hydrophobic material is mixable with said hydrophobic liquid at about 75 degrees Fahrenheit ambient; and
c) laying an asphalt layer on top of said primer;
wherein said hydrophobic liquid of said primer promotes adhesion between said asphalt layer and said layer of base material.

9. The paving method of claim 8, wherein said first hydrophobic material is a pyrolysis carbon black material.

10. The paving method of claim 8, wherein said hydrophobic liquid is obtained by depolymerization.

11. The paving method of claim 8, wherein said base layer comprises concrete.

12. The paving method of claim 8, wherein said base layer comprises asphalt.

13. The paving method of claim 8, wherein said hydrophobic liquid is a pyrolysis oil.

14. The paving method of claim 13, wherein said pyrolysis oil is obtained from pyrolysis of a carbon-comprising product.

15. The paving method claim 13, wherein said pyrolysis oil is obtained during a product-recycling process.

16. A pavement comprising:
    a base layer;
    an asphalt layer above said base layer and adhesively joined to said base layer; and
    a pyrolysis carbon black material having a thickness of less than about 0.02 inches interspersed between said asphalt layer and said base layer, wherein said pyrolysis carbon black material has a property of enhanced heating upon being exposed to a microwave energy; and
    wherein each of said asphalt layer and said base layer is substantially free of said pyrolysis carbon black material.

17. A method of repairing an asphalt pavement having a base layer, an asphalt layer above said base layer, and a pyrolysis carbon black material having a thickness of less than about 0.02 inches interspersed between said asphalt layer and said base layer, wherein each of said asphalt layer and said base layer is substantially free of said pyrolysis carbon black material, said method comprising the steps of:
    a) radiating a microwave energy from above said asphalt layer, wherein the applied microwave energy penetrates through said asphalt layer and is substantially absorbed by said pyrolysis carbon black material, thereby heating said pyrolysis carbon black material and weakening adhesion between said base layer and said asphalt layer; and
    b) stripping at least a portion of said asphalt layer from the base layer using a wheel loader.

18. The method of claim 17, wherein the step of radiating a microwave energy comprises controlling at least one of a duration of radiating and a microwave power level.

19. The method of claim 17, wherein said base layer comprises concrete.

20. The method of claim 17, wherein said base layer comprises asphalt.

* * * * *